J. JACKSON.
ANIMAL TRAP.
APPLICATION FILED MAY 29, 1908. RENEWED APR. 17, 1909.
938,239.
Patented Oct. 26, 1909.
2 SHEETS—SHEET 1.
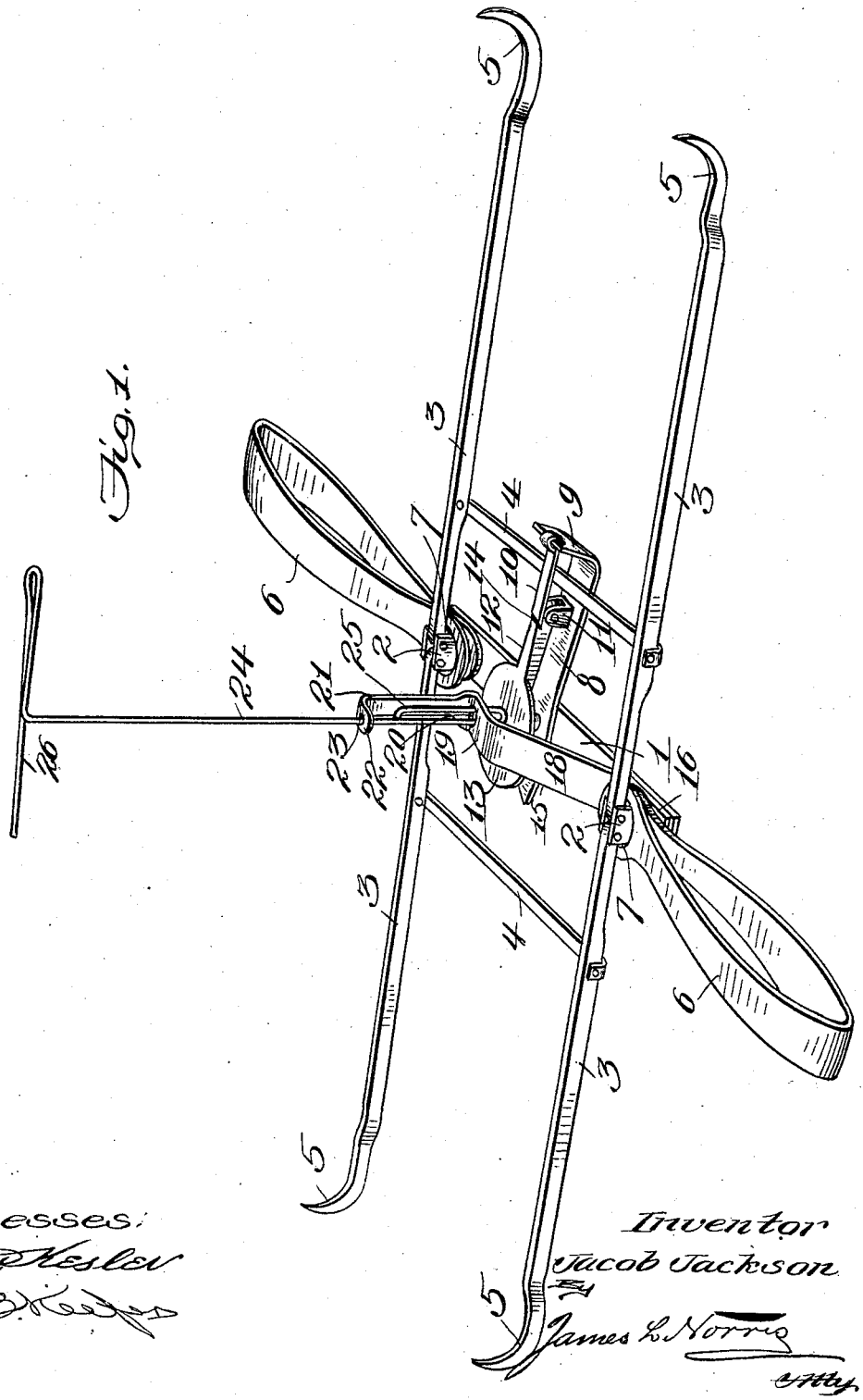
Witnesses:
Inventor
Jacob Jackson
By
James L. Norris
Atty.

J. JACKSON.
ANIMAL TRAP.
APPLICATION FILED MAY 29, 1908. RENEWED APR. 17, 1909.
938,239.
Patented Oct. 26, 1909.
2 SHEETS—SHEET 2.
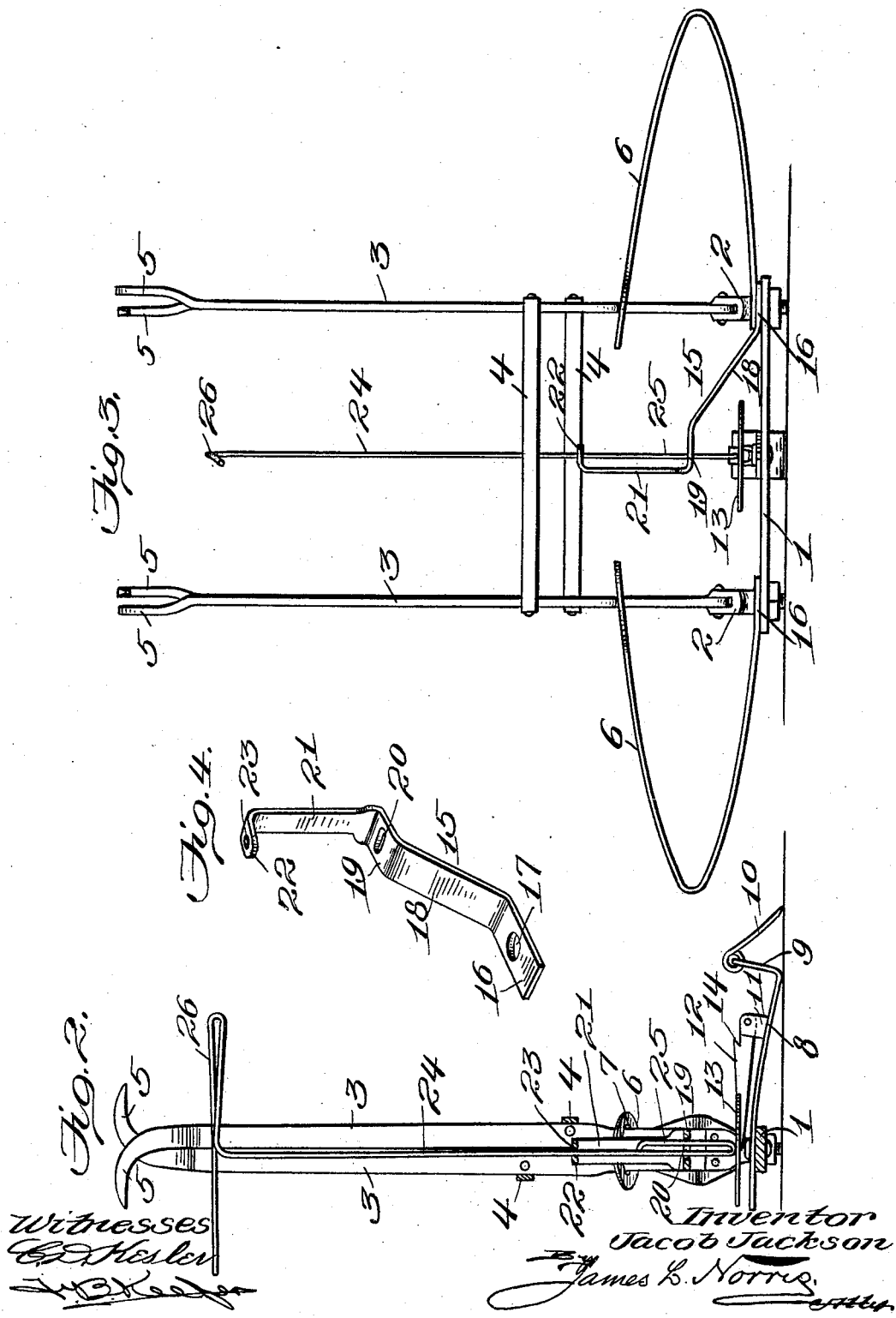

UNITED STATES PATENT OFFICE.

JACOB JACKSON, OF GREEN BAY, WISCONSIN.

ANIMAL-TRAP.

938,239.　　　　　Specification of Letters Patent.　　Patented Oct. 26, 1909.

Application filed May 29, 1908, Serial No. 435,669. Renewed April 17, 1909. Serial No. 490,640.

*To all whom it may concern:*

Be it known that I, JACOB JACKSON, a citizen of the United States, residing at Green Bay, in the county of Brown and State of Wisconsin, have invented new and useful Improvements in Animal-Traps, of which the following is a specification.

This invention relates to animal traps of that class embodying spring-actuated jaws and in this instance adapted to be submerged in water to entrap a swimming animal.

The object of the invention, therefore, is to provide a trap that may be submerged in a waterway, such as a river, creek, or the like, at such a depth as to be hidden and having means which, when struck by the swimming animal, will release the jaws and catch the body of the animal at an under vital part and resulting in drowning of the animal and a submerging of the body to prevent the latter from being stolen.

The invention consists essentially in combining with a trap of usual form having elongated jaws of an extended release means or trigger attachment which is so positioned in relation to the remaining parts of the trap that the jaws will be released when the upper extremity of the attachment is engaged or struck by the body of the swimming animal and result in a grasp and penetration of the lower portion of the body of the animal by the said jaws.

In the drawings: Figure 1 is a perspective view of a trap shown open or set and embodying the features of the invention. Fig. 2 is a section through the trap, the parts being shown in closed positions. Fig. 3 is an elevation of the trap shown closed. Fig. 4 is a detail perspective view of the support for the extended release means or trigger attachment.

Similar characters of reference are employed to indicate corresponding parts in the several views.

The numeral 1 designates a base support having fulcrum posts 2 adjacent to opposite extremities in each of which are pivoted a pair of elongated jaws 3, the jaws being connected by cross braces or tie bars 4 so that two jaws unitedly operate on each side of the base support 1. Each of the jaws is deflected to form a terminal grasping hook or claw 5, the jaw terminal being suitably reduced, and the deflections of coöperating jaw terminals being in reverse directions so that the hooks or claws will pass each other, as clearly shown by Figs. 2 and 3. Looped springs 6 are used for forcefully closing the jaws, the lower member of each spring being held down close to the base support 1 and the upper member provided with an inner freely movable extremity having an enlarged opening 7 therein for moving upwardly over the jaws 3 when the latter are released to forcefully close the said jaws, as shown by Figs. 2 and 3. Extending outwardly in a plane at right angles from the base support 1 is an immovable trip support 8 having an outer upturned end 9 to which is movably attached a latch 10 adapted to project inwardly toward the support 1 over the adjacent brace 4 and a part of the support 8. A post or projection 11 rises from the support 8 and has the outer end of the shank 12 of a trip pan 13 loosely pivoted therein, the said shank 12 having an upper angular notch 14 for engagement with the latch 10 to hold the trip pan in set position and to maintain the jaws 3 in open positions against the resistance of the springs 6. It will be understood that a depression of the trip pan 13 and release of the latch 10 will liberate the jaws 3 and permit the springs 6 to forcefully close the said jaws. The trap as thus far described is similar to animal traps now in use except in the particular arrangement of the jaws and the elongation of the latter to adapt the present form of trap embodying the features of the invention for use as a water trap.

The essential feature of the invention, however, consists in providing means for depressing and releasing the trip pan 13 from a suitable distance, or any distance that may be desired above the said trip pan and to have the jaws 3 elongated sufficiently to position their terminals, when closed, above the upper terminal of the extended release means. The extended release means attachment consists of a holder 15, shown in detail by Fig. 4, and provided with a lower connecting member 16 with an opening 17 therethrough to fit over one of the fulcrum posts 2 and under one of the spring members, as clearly shown by Figs. 1 and 3. From the connecting member 16 an arm 18 is inclined upwardly to a horizontal seat 19 having a slot 20 therein, and from the seat a guide 21 projects vertically and has an upper inturned end 22 with an opening 23 therethrough in vertical alinement with the slot 20 in the said seat 19. The seat 19 is disposed over and held above the trip pan 13 and with the upper inwardly bent terminal 22 of the vertical guide 21 forms means for holding a vertical stem 24 in position, the said stem constituting the release extension or trigger and formed from wire of suitable gage. The lower extremity of this stem is bent to form an elongated loop 25 which is freely movable in the slot 20, the upper terminal of this loop providing a stop to prevent the withdrawal of the release extension or trigger from the holder 15 after such extension has been applied in operative position. The upper end of the release extension or trigger is provided with a contact head or projection 26 which is preferably formed by first forming the loop 25 and inserting the stem 24 upwardly through the guide 21 and completed by bending the upper end of the stem at right angles and then looping the same and returning the free extremity in a horizontal plane beyond the stem in an opposite direction to form the head 26. This contact head is held in central position with respect to the remaining parts of the trap and in a plane substantially parallel with the jaws 3 when the latter are open, the said head being maintained in this position by the loop 25 which prevents rotation of the stem 24. The stem 24 and loop 25 have a limited vertical movement so that when the said head is struck or the body of an animal comes into contact therewith the pressure exerted thereon will be transmitted downwardly through the stem 24 and loop 25 to the trip pan 13, thus releasing the latter and liberating the jaws 3 for quick closing action through the medium of the springs 6. The holder 15 carrying the extension release or trigger may be thrown in or out in relation to the trap owing to the formation of the opening 17 and which is large enough to freely swing on the fulcrum post engaged thereby. In the event that the wire stem 24 or the head 26 thereof becomes broken, it may be readily replaced by shaping another similar wire, by first inserting the new wire through the opening 23 at the upper end of the guide 21 and bending the lower extremity to produce the loop 25 and then completing the head 26.

The resistance to rotation of the stem 24 by the loop 25 when the body of the animal comes into contact with the head 26 insures a reliable operation of the trap, or an entrapping of the animal.

In preparing and placing the trap in operative position, the jaws 3 are opened and held in open condition by the latch 10 which is set in the notch 14 of the shank of the trip pan 13. A cord is then attached to the stem 24 and the trap is submerged in water to such an extent as to locate the contact head 26 about two inches below the surface of the water, the head 26 standing across the stream and the springs 6 directed up and down stream so that the jaws will close in opposing transverse directions with relation to an animal swimming either up or down stream and contacting with the head 26. If the water of the stream in which it is desired to set the trap is too deep in parts or at the center of the stream, the trap should be positioned in shallow water or water just deep enough to be about two inches over the head 26 when the trap is resting on the bed of the stream, and brush or other material should then be placed in the stream so as to force the animal to swim toward and over the trap. When the animal strikes the trap, the jaws 3 are released and engage the under part of the body of the animal instead of one of its legs as in ordinary animal trap operations, or the jaws may embrace the body of the animal, and the animal is so held as to quickly drown and sink out of sight of thieves and animals.

The improved trap will be found exceptionally useful in catching valuable fur animals addicted to swimming in streams, and is reliable in its work as well as preventing loss of trapped animals.

Having thus described the invention, what is claimed as new, is:

1. In a trap of the class specified, the combination of automatically closing jaws, a support to which the jaws are movably attached, and locking means for the jaws having a portion thereof extending over the support, and a non-rotatable upwardly projecting release means having a laterally extending head at its upper extremity, the lower extremity of the release means loosely bearing upon the portion of the locking means extending over the support.

2. In a trap of the class set forth, the combination of a lower support, jaws movably attached to said support, a locking means for the jaws having a portion extending over the support, and a release extension located between the jaws and projecting above the support and the jaws when the latter are open, the lower end of the extension loosely engaging the portion of the locking means projecting over the support.

3. In a trap of the class specified, the combination of a support, jaws movably attached to said support, a locking means for the jaws to hold the latter open and partially extending over the support, and a non-rotatable release extension held in central relation to the jaws and loosely bearing on the portion of the locking means extending over the support, the upper extremity of the release extension being provided with an angular head disposed in a plane parallel with the jaws when the latter are open.

4. In a trap of the class specified, a support having an arm projecting upwardly therefrom and terminating in vertical guide means, a locking means for the jaws of the trap having a portion thereof extending under the arm, and a release extension vertically movable in the guide means of the arm and loosely engaging at its lower extremity the portion of the locking means extending under the arm.

5. In a trap of the class specified, a holder movably connected to a part of the trap, a pair of spring-actuated jaws on each side of the trap, a trip pan and catch operating to hold the jaws open, and an extended release means carried by the holder and loosely engaging the trip pan and provided with an upper non-rotatable laterally extending head.

6. A trap for use in water comprising automatically operating jaws, provided with means for locking the same open, and means between the jaws adapted to loosely bear on a part of said locking means and extending vertically above the base of the trap for releasing the jaws when engaged by a swimming animal.

In testimony whereof I have hereunto set my hand in presence of two subscribing witnesses.

JACOB JACKSON.

Witnesses:
M. A. ONSTAD,
CHAS. G. KERR.